US010143143B2

(12) United States Patent
MacKenzie

(10) Patent No.: US 10,143,143 B2
(45) Date of Patent: Dec. 4, 2018

(54) METHOD OF COMPRESSING AND FREEZING FOREST FLOOR MATERIAL FOR RE-VEGETATION

(71) Applicant: Vertex Professional Services Ltd., Edmonton (CA)

(72) Inventor: Dean MacKenzie, Sherwood Park (CA)

(73) Assignee: Vertex Professional Services Ltd., Edmonton (CA)

(*) Notice: Subject to any disclaimer, the term of this patent is extended or adjusted under 35 U.S.C. 154(b) by 714 days.

(21) Appl. No.: 14/519,769

(22) Filed: Oct. 21, 2014

(65) Prior Publication Data

US 2015/0107153 A1 Apr. 23, 2015

Related U.S. Application Data

(60) Provisional application No. 61/893,815, filed on Oct. 21, 2013.

(51) Int. Cl.
*A01G 22/00* (2018.01)
*A01G 1/00* (2006.01)
*A01G 23/00* (2006.01)

(52) U.S. Cl.
CPC ............. *A01G 1/001* (2013.01); *A01G 22/00* (2018.02); *A01G 23/00* (2013.01)

(58) Field of Classification Search
CPC ..... A01G 13/0262; A01G 9/10; A01G 9/1026
See application file for complete search history.

(56) References Cited

U.S. PATENT DOCUMENTS

| 3,733,745 | A | * | 5/1973 | Ingerstedt | A01G 9/02 47/56 |
|---|---|---|---|---|---|
| 4,332,093 | A | | 7/1982 | Berthollet | |
| 4,517,764 | A | | 5/1985 | Dedolph | |
| 9,296,122 | B2 | * | 3/2016 | Gustafson | B30B 9/28 |
| 2002/0078623 | A1 | * | 6/2002 | Raddon | C10L 5/44 44/590 |
| 2007/0180763 | A1 | * | 8/2007 | Lougheed | A01G 13/0262 47/9 |
| 2007/0292217 | A1 | * | 12/2007 | Karpik | D04H 1/04 405/302.7 |
| 2011/0281331 | A1 | * | 11/2011 | Paulsen | C12N 1/00 435/252.1 |
| 2013/0020738 | A1 | | 1/2013 | Rubin | |

FOREIGN PATENT DOCUMENTS

| EP | 0092990 | 11/1983 |
|---|---|---|
| EP | 2452555 | 5/2012 |
| EP | 2457438 | 5/2012 |

* cited by examiner

*Primary Examiner* — Kristen C Hayes
(74) *Attorney, Agent, or Firm* — Baker & Hostetler LLP

(57) ABSTRACT

A method of revegetating a forest is provided, including the steps of: collecting a volume of forest floor material; wetting the volume of material with a wetting agent; compressing the wetted forest floor material; freezing the compressed forest floor material; separating the frozen forest floor material into a plurality of smaller pieces; storing the frozen pieces in a frozen environment; and distributing at least a portion of the pieces on land to be revegetated.

12 Claims, 2 Drawing Sheets

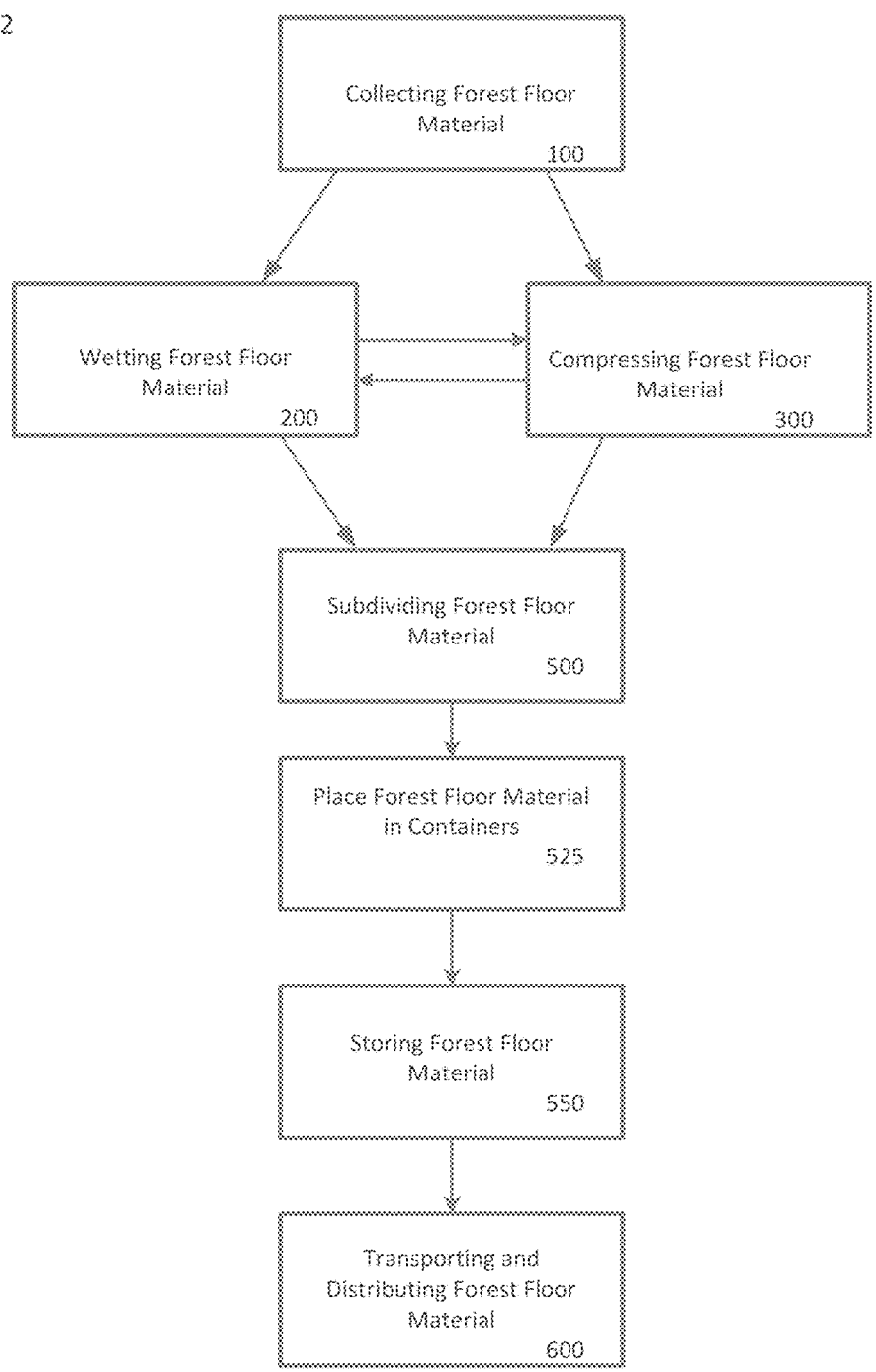

METHOD OF COMPRESSING AND FREEZING FOREST FLOOR MATERIAL FOR RE-VEGETATION

CROSS REFERENCE TO RELATED APPLICATIONS

This application claims the benefit of U.S. Provisional Application No. 61/893,815 filed Oct. 21, 2013, which is hereby incorporated by reference in its entirety.

TECHNICAL FIELD

The invention relates to preserving forest floor material for re-establishing native forest vegetation after disturbances; particularly anthropogenic disturbances, such as mines and oil and gas developments.

BACKGROUND

Establishing native forest vegetation after a disturbance (e.g. a mine) or in areas where forest vegetation did not previously exist can be costly and time-consuming. Seeds or propagules for native forest vegetation may not be obtainable from traditional sources such as greenhouses, nurseries or seed cooperatives. As an increasing amount of forests are being disturbed there has been a corresponding increasing societal and regulatory demand for re-establishment of native forest vegetation.

Collection and planting of soil plugs can establish native boreal plants; however, this method is very labor intensive and costly. An additional cost associated with planting soil plugs is the additional time required to hand dig holes for planting the plugs on the land where native forest vegetation is desired. Soil plugs are not compressed and transporting plugs without causing damage to the integrity of the plug is difficult.

The use of forest floor material, such as the organic matter horizon that accumulates on the mineral soil surface under forest vegetation (referred to as LFH), which can contain thousands of seeds and vegetative propagules from many different native forest species, has been shown to be an effective way of establishing native forest vegetation. Forest floor material also contains nutrients, micro-organisms and soil fauna and provides water holding capacity which improves the growth of forest species.

Currently, forest floor material may be salvaged prior to the initiation of anthropogenic disturbances. The bulked material is then transported to land where native forest vegetation is desired and a continual layer of the forest floor material is spread on the surface of the land. However, the forest floor material is usually stockpiled and stockpiling reduces the viability of the seeds and vegetative propagules. Additionally, there may not always be stockpiled material at the time it is needed for reclamation.

Salvaging forest floor material from other locations and transporting to the land where native forest vegetation is to be established could overcome the above limitations; however, transporting the required quantity of material is often not economically feasible and the material may still have to be stored, reducing the viability of seeds and vegetative propagules.

Compacting or compressing the forest floor material reduces transportation costs. In its bulked form, forest floor material has a lower density and vehicles used for transportation can be loaded to their maximum volume (but not to their maximum weight). If the material is compressed, then the vehicles may be loaded to both their maximum volume and weight. Compressed forest floor material creates additional benefits for plant establishment, such as improved moisture retention, nutrient concentration and soil to propagule contact.

A continual layer of compressed forest floor material may not need to be applied to land where the native forest vegetation is desired, as there is a higher concentration by volume of seeds and vegetative propagules contained in the compressed material (and in the bricks, slabs, wafers, pellets or any other shape of the compressed material, referred to herein as "Products") allowing the material to be evenly distributed with spaces between each Product. Vegetation established from the Products could fill in the spaces between the Products Direct placement of forest floor material at shallow depths does not provide good seed/vegetative propagule to soil contact; therefore many seeds/vegetative propagules dry out and die. Large equipment cannot move through existing reclaimed forested areas without disturbing the trees and other plants.

Attempts have been made to mix the forest floor materials with a mulch or hydro mulch, which does not preserve all seeds and vegetative propagules in the material. Processing forest floor materials results in the destruction of vegetative propagules. These methods require specialized amendments and equipment for processing and application and the specialized equipment likely cannot move through existing reclaimed forested areas.

Related patent literature includes EP 0092990; US 20130020738; EP 2457438; US 20020078623; EP2452555; U.S. Pat. No. 4,517,764; and U.S. Pat. No. 4,332,093.

SUMMARY

A method of re-establishing native forest vegetation is provided, including the steps of: collecting a volume of forest floor material; wetting the volume of material with a wetting agent or another fluid with or without amendments/augmentation; compressing the wetted forest floor material; freezing the compressed forest floor material; separating the frozen forest floor material into a plurality of smaller pieces; storing the frozen pieces in a frozen environment; and distributing at least a portion of the pieces on land to be revegetated.

The forest floor material may be collected when plant life in the forest is dormant. The forest floor material may be wetted to the point of saturation. The wetting agent may be water, or an emulsifier. The forest floor material may be frozen using atmospheric conditions or refrigeration. The material may be frozen within 90 days of collection, and the smaller shapes may each have a volume of less than 1 m$^3$.

A method of revegetating a forest is provided, including collecting forest floor material; wetting the material with a wetting agent; compressing the wetted forest floor material; freezing the compressed forest floor material; separating the frozen forest floor material into a plurality of frozen smaller pieces; storing the frozen pieces in a frozen environment; and distributing at least a portion of the pieces on land to be revegetated.

The forest floor material may be collected when plant life in a forest is within four weeks of dormancy or when the plant life is dormant. The forest floor material may be wetted to a point that allows effective freezing of the forest floor material or wetted to saturation. The wetting agent may include water, fertilizer or an emulsifier. The forest floor material may be frozen using atmospheric conditions or refrigeration.

The forest floor material may be frozen within 90 days of collection and the smaller pieces may each have a volume of less than 1 m³. A growing medium may be used in distributing at least a portion of the pieces on land to be revegetated.

A method of preserving forest floor material is provided, including wetting collected forest floor material with a wetting agent; compressing the wetted forest floor material; freezing the compressed forest floor material; separating the frozen forest floor material into a plurality of smaller shapes; and storing the frozen pieces in a frozen environment.

A method of preserving forest floor material is provided, including collecting forest floor material; wetting the material with a wetting agent; compressing the wetted forest floor material; placing the forest floor material into a container; storing the forest floor material in the containers, such as bags; and distributing at least a portion of the pieces on land to be restocked.

A plurality of pieces of frozen floor material is proved, prepared by a process comprising the steps of: collecting forest floor material; wetting the material with a wetting agent; compressing the wetted forest floor material; freezing the compressed forest floor material; and separating the frozen forest floor material into a plurality of frozen smaller pieces.

BRIEF DESCRIPTION OF THE DRAWINGS

FIG. 2 is a flow chart showing an alternative method according to the invention.

DETAILED DESCRIPTION OF ILLUSTRATIVE EMBODIMENTS

Figure 1:
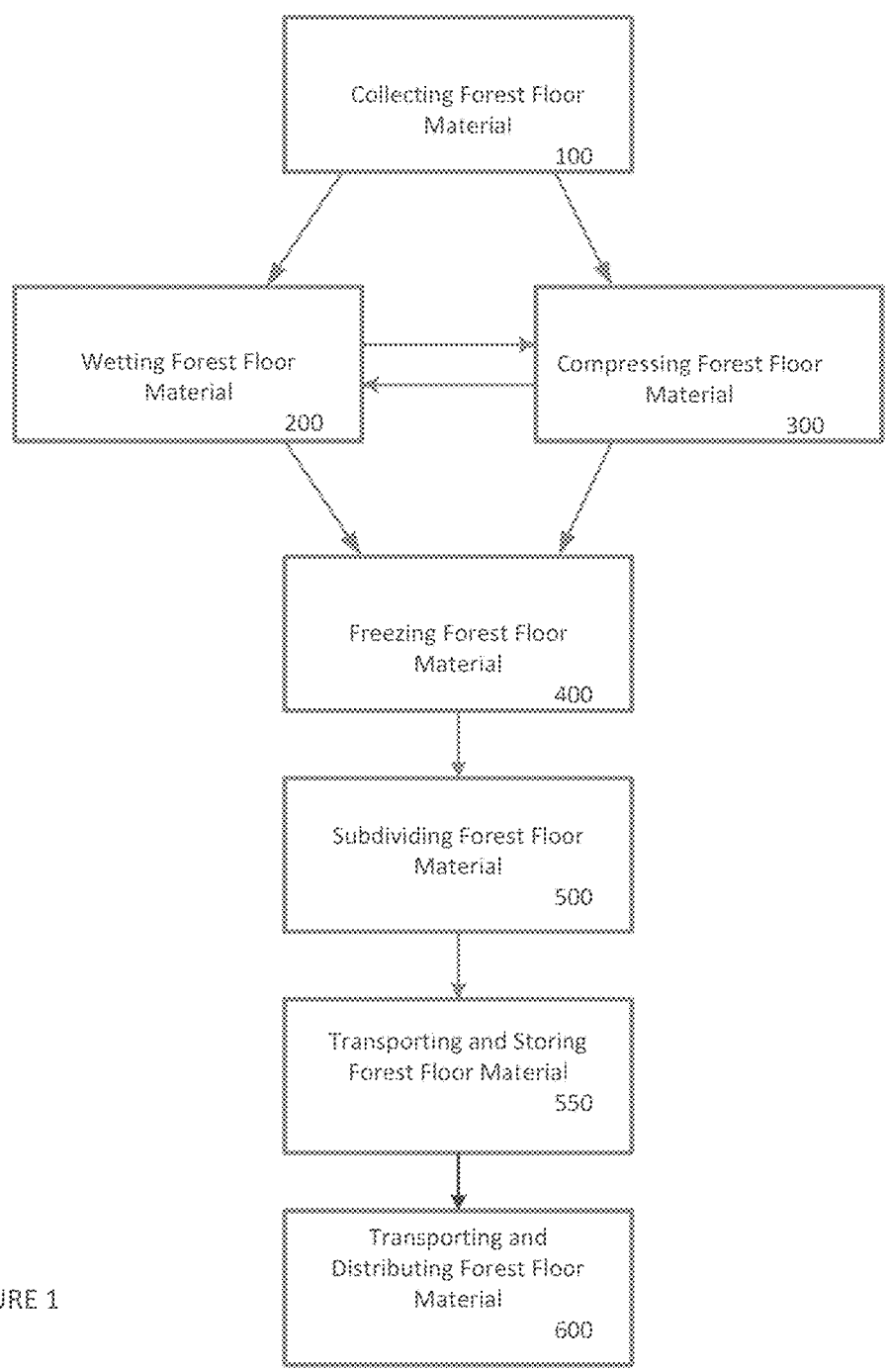
FIG. 1 is a flow chart showing the method according to the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) are to be taken as limiting in any way as the scope of the disclosed invention(s). An Abstract has been included in this application merely because an Abstract of not more than 150 words is required under 37 C.F.R. section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

For the purpose of this document "forest floor material" refers to the organic material (partial or entire layers/horizons) or a mix of the organic material with the upper portion (e.g. upper 30 cm) of mineral soil from upland, lowland or transitional land. Upland refers to land that is dry long enough to promote upland forest processes, indicated by imperfect to rapidly drained soil and non-hydrophilic vegetation. Lowland refers to land that is saturated with water long enough to promote wetland or aquatic processes, indicated by poorly drained soil and hydrophilic vegetation. Transitional refers to land with soils that are developed on mineral material under forest in locations with imperfect drainage or wetter, typically including an organic horizon over a mineral horizon. An actual forest may or may not be present and forest floor material may be developed on natural undisturbed lands, disturbed lands, restored or reclaimed lands or revegetated stockpiles.

For the purpose of this document "organic material" refers to LFH, peat, organic soil and muskeg. As mentioned above, LFH refers to the forest floor material that accumulates on the mineral soil surface under forest vegetation, which includes litter and unincorporated humus. The term LFH or LFH-mineral mix is a common term used to describe the forest floor material from an upland forest; other terms that have been used include forest floor-mineral mix, forest litter, litter, upland surface soil or the duff layer. Peat is organic material constituting peat lands comprised largely of organic residues accumulated as a result of incomplete decomposition of dead plant constituents under conditions of excessive moisture (submergence in water and/or waterlogging). Organic soil refers to an order of soils that have developed dominantly from organic deposits. The majority of organic soils are saturated for most of the year, unless artificially drained, but some of them are not usually saturated for more than a few days. Organic soils contain more than 17% organic carbon by weight. Muskeg is a layman's term used to describe peat and organic soils.

Referring to FIG. 1, the process begins with the collection of forest floor material (step 100). This is typically done when the plant life is dormant (i.e. during the fall, winter and early spring) or within about four weeks of dormancy, to help conserve seeds and vegetative propagules. The forest floor material is typically collected using a bulldozer or any other efficient piece of machinery (excavator, scraper, etc.). The forest floor material with the greatest amount of viable seeds and vegetative propagules should be selected for compressing and freezing. The forest floor material should contain less than 50% mineral soil by volume to prevent the seeds and vegetative propagules from being diluted with non-propagating material. To further concentrate propagules within the forest floor material, rocks, large stumps and woody material can be screened out of the forest floor material.

A wetting agent is then added to the collected forest floor material (step 200) to a point where the material becomes moist, wet or saturated. This aids the later steps of compression and freezing and also helps maintain seed and vegetative propagule viability and germination/emergence. The wetting agent may be water, a mixture of water and fertilizer, smoke water, non-ionic surfactant, emulsifier, polymers, or mixtures thereof, or any amendment that promotes germination and enhances water retention. The material should be wetted such that enough wetting agent is present at least to effectively freeze the forest floor material after compression to a maximum of complete saturation of the forest floor material. The wetness of the forest floor material may depend on the type of forest floor material being used. Alternatively, as described later, the wetting can take place after compression.

The wetted or saturated forest floor material is then compressed (step 300). Wet or saturated forest floor material can be compressed using a tool such as an excavator bucket, agricultural roller, or other compression device that can press the forest floor material into the desired molds, forms or bags. The compression can be done at the location where forest floor material is salvaged and collected or at a different location. The forest floor material should be compressed to various degrees, but should be compressed to a state greater than its bulked volume (i.e. the state of material after rough handling, such as free dump into a pile, or pushed directly into a windrow). The compression assists in binding the forest floor material and improves seed and vegetative propagule to forest floor material contact.

Compression of the forest floor material helps concentrate propagules and provides a dense medium that allows for excellent seed/propagule to soil and/or organic material contact. The forest floor material can be compressed into various sizes and shapes as desired for ease of storage, transport and later distribution. Bricks, slabs, wafers, pellets or other shapes may be used. If the forest floor material has not yet been wetted, or alternatively, is to be wetted again, then the material should be wetted, at a minimum, such that enough wetting agent is present to effectively freeze the forest floor material together after compression, to a maximum of complete saturation of the forest floor material. The wetness of the forest floor material will depend on the type of forest floor material being used.

The wetted, compressed forest floor material is then frozen (step 400). The forest floor material may be frozen using atmospheric conditions, if the temperature persists at or below 0° C. The length of time required for the material to freeze will depend on the physical properties of the forest floor material, temperature, water content of forest floor material, bulk density of forest floor and size of matrix being frozen. The forest floor material can be stored in its frozen state for as long as needed; however, minimizing storage time will help retain seed and vegetative propagule viability (e.g. <3 months). Alternatively, the wetted, compressed forest floor material may be frozen at or below 0° C. using refrigeration. Freezing the forest floor material allows for efficient handling and transport of the material without causing damage to the propagules within. Forming various sized shapes, such as bricks, slabs, wafers, pellets or other shapes of the forest floor material when it is frozen helps maintain the increased density of the material after compression has occurred. These shapes can be formed either before or after the freezing process. Specialized equipment should be used if the material is shaped before freezing (e.g. placing unfrozen forest floor material into a tube that compresses material as it freezes) and more crude methods of shaping could be used if the material is shaped after freezing (e.g. breaking a compressed, wetted pile of forest floor material with a track hoe and further sorting shape sizes afterwards). Additionally, freezing the forest floor material helps maintain the viability of the propagules within. Wetted or saturated forest floor material should be frozen within a short time frame of salvaging, such as less than 90 days, to preserve seed and vegetative propagule viability. Freezing the forest floor material prevents the material from drying out, slows respiration of tissue and preserves carbohydrate reserves of vegetative propagules and prevents germination of seeds.

The compressed forest floor material may then be formed into smaller units by cutting, breaking or smashing the shapes into smaller pieces (step 500). Such smaller units allow for ease of distribution over a larger area and reduce transportation costs. In an embodiment of the invention, the forest floor material units are greater than 0.05 m thick and have a surface area greater than 0.0025 m², but a volume less than 1 m³. This size allows for the compressed and frozen forest floor material to be easily distributed over a larger area with lower transportation costs, but large enough to provide a sufficient supply of seeds and propagules and forest floor material for successful emergence.

The forest floor material shapes are then stored (step 550) and may be transported to an appropriate location (step 600). The forest floor material should be kept frozen to maintain the viability of the seeds and vegetative propagules. The material may be kept frozen in atmospheric conditions, which are below 0° C., or under refrigeration.

The final step is to distribute the compressed and frozen forest floor material (be it bricks, slabs, wafers, pellets or other shapes of compressed and frozen material) on land where native forest revegetation is desired. Various techniques can be used for this including by hand methods, small, medium and large equipment (e.g. all-terrain vehicles, skid-steer loaders, dump trucks) or other specialized equipment (e.g. manure spreaders).

The bricks, slabs, wafers, pellets or other shapes of compressed and frozen forest floor material can be distributed at different spacing allocations. For example, the distribution may be one brick of 0.5 m² in size for every 1 m² of land where the native forest vegetation is desired. Alternatively, the distribution may be one brick of 0.5 m² in size for every 10 m² of land. Other distributions may be used without departing from the scope of the invention. The spacing of the bricks, slabs, wafers, pellets or other shapes of compressed and frozen forest floor material will affect the cost and the amount of time it will take for native forest vegetation to completely colonize the area as it spreads from the forest floor material. A growing medium may be used to assist growth as the bricks, slabs, wafers, pellets or other shapes could be placed on a growing medium such as peat or peat-mineral mix to assist growth. Also the bricks, slabs, wafers, pellets or other shapes could be wrapped or covered with a fabric, bag or mulch to help retain moisture to assist growth. Note bricks, slabs, wafers may rest on the surface or be incorporated at a shallow depth (e.g. <20 cm).

In an alternative embodiment of the invention, as shown in FIG. 2, rather than freezing the forest floor material, the forest floor material can be placed in storage containers such as bags (step 525), after being compressed (step 300) and wetted (step 200). The container used should be able to contain the moisture within the wetted forest floor material to prevent the forest floor material from drying out. When subdividing the forest floor material (step 500), the smaller pieces of forest floor material can be placed into smaller containers for storage prior to transport and distribution (step 600).

The above-described embodiments have been provided as examples, for clarity in understanding the invention. A person with skill in the art will recognize that alterations, modifications and variations may be effected to the embodiments described above while remaining within the scope of the invention as defined by claims appended hereto.

What is claimed:

1. A method of revegetating a forest, comprising the steps of:
    mechanically collecting forest floor material comprising seeds and vegetative propagules of plant life in the forest;
    wetting the forest floor material with a wetting agent;
    mechanically compressing the wetted forest floor material;
    freezing the compressed forest floor material;
    separating the frozen forest floor material into a plurality of frozen pieces having a volume of less than 1 m³;
    storing the frozen pieces in a frozen environment; and
    distributing at least a portion of the pieces on land to be revegetated.
2. The method of claim 1 wherein the forest floor material is wetted with the wetting agent such that the step of freezing the compressed forest floor material creates a frozen solid mass of forest floor material that retains a compressed shape until separated.
3. The method of claim 1 wherein the wetting agent comprises water.
4. The method of claim 1 wherein the wetting agent comprises water and fertilizer.
5. The method of claim 1 wherein the wetting agent comprises an emulsifier.
6. The method of claim 1 wherein the step of freezing the compressed forest floor material comprises freezing the forest floor material using atmospheric conditions.
7. The method of claim 1 wherein the step of freezing the compressed forest floor material comprises freezing the forest floor material using refrigeration.
8. The method of claim 1 wherein the freezing is performed within 90 days of the collecting.
9. The method of claim 1 wherein a growing medium is used in distributing at least a portion of the pieces on land to be revegetated.
10. A method of preserving forest floor material, comprising:
    wetting collected forest floor material with a wetting agent, wherein the forest floor material comprises seeds and vegetative propagules;
    mechanically compressing the wetted forest floor material;
    freezing the compressed forest floor material;
    separating the frozen forest floor material into a plurality of shapes having a volume of less than 1 m³; and
    storing the separated forest floor material in a frozen environment.
11. A method of revegetating a forest, comprising:
    mechanically collecting forest floor material comprising seeds and vegetative propagules of plant life;
    wetting the material with a wetting agent;
    mechanically compressing the wetted forest floor material;
    placing the forest floor material into a plurality of containers;
    storing the forest floor material in the plurality of containers; and
    distributing at least a portion of the forest floor material on land to be revegetated.
12. The method of claim 11 wherein the plurality of containers comprises bags.

* * * * *